COINCIDENCE GATE CIRCUIT WITH LOW-OHMIC LOAD

Original Filed Feb. 26, 1957

INVENTORS
HEINZ GUMIN
HELMUT WEBER

BY [signature]
ATTORNEYS

United States Patent Office 3,482,112

Patented Dec. 2, 1969

3,482,112

COINCIDENCE GATE CIRCUIT WITH LOW-OHMIC LOAD

Heinz Gumin, Munich, Germany, and Helmut Weber, Vestal, N.Y., assignors to Siemens Aktiengesellschaft, Munich, Germany, a corporation of Germany Continuation of application Ser. No. 642,513, Feb. 26, 1957. This application Apr. 21, 1965, Ser. No. 449,715

Int. Cl. H03k *19/22, 19/30*

U.S. Cl. 307—218 1 Claim

ABSTRACT OF THE DISCLOSURE

A coincidence gate circuit operatively connecting a plurality of input circuits with a common output circuit for predetermined transfer of current impulses in the presence of simultaneous pulses on the respective inputs, in which at least two inputs are provided to which current impulses with similar amplitudes may be extended and a single output operatively connected to the input circuits, an auxiliary voltage source, and a current branching circuit, such current branching circuit including resistors respectively connecting the individual inputs to the output, a resistor operatively connecting such output to the auxiliary voltage source and a diode operatively connecting said output to ground, with the diode being so poled that current will flow from said auxiliary voltage source over said last mentioned resistor and said diode, such last mentioned resistor and said input resistors being so dimensioned that the magnitude of a single input impulse is insufficient to block said diode but the magnitude of two simultaneous input impulses is operative to block said diode, whereby response to the simultaneous triggering of such inputs a current impulse is produced at the output which is formed directly by the current of the input impulses.

This application is a continuation of copending application Ser. No. 642,513, filed Feb. 26, 1957, now abandoned.

This invention is concerned with gate circuits used in communication systems and especially in machines for processing messages. A gate circuit is, generally speaking, a circuit for technically realizing logical interconnections.

For example, a coincidence gate is a circuit which delivers at its output a predetermined criterion, for instance, a pulse responsive to predetermined simultaneously existing control conditions at its input side. The general requirement posed is that a pulse should appear at the output of a coincidence gate which is of a form corresponding to pulses delivered to its input side.

The requirement in the case of a mixing gate is, on the other hand, that a signal appear at the output responsive to the presence of a criterion on at least one of its inputs. Another requirement in the case of a mixing gate may be production of an output signal which shall be of the same magnitude regardless of the presence of a control or triggering criterion on one or even on all of its inputs.

The requirement in the case of a blocking gate is, that a pulse placed on its main input or inputs shall be permitted to pass only in the absence of a pulse on its blocking input; no criterion, for example, a pulse, shall appear at the output in the presence of a control pulse on its blocking input.

Several types of gate circuits are known. The aim in connection with gate circuits always is, that the voltage of the pulses appearing at the output should correspond at least approximately to that of the pulses conducted to the input side. However, the use of passive elements, for example, diodes, in the gate circuit causes damping of the current and therewith damping of the energy content of the passing pulses. If a plurality of such gates is to be connected in series, it will accordingly be necessary to provide intermediate amplifiers. In practical operation, there is provided an amplifier after each gate circuit, for example, a grid controlled high vacuum triode.

The problem underlying the invention is, to reduce as much as possible the expenditures in connection with an individual gate, preferably including the amplifier element cooperating therewith. This problem is technologically extraordinarily important. Numerous gates are used in some machines, for example, calculating machines or computers, and it is therefore important to reduce the expenditure for the individual amplifiers of the gates as well as the energy input.

The problem can be solved by the use of semiconductor amplifiers, for example, transistors. However, difficulties appear upon attempting to use, in a gate of customary construction with an amplifier connected therewith, a transistor for amplifying the output signal in a manner corresponding to the prior use of high vacuum tubes, because the transistor cannot be directly utilized for amplifying the current, considering that the pulses passing through the gate should have in view of the computing speed a pulse repetition rate as high as possible. The corresponding requirement can be fulfilled only if the transistor is operated in a basic circuit.

The object of the invention is to provide a gate which is adapted to actuate a semiconductor amplifier, for example, a transistor connected in series therewith. The gate according to the invention is for this purpose constructed so that the full current which is conducted to its input or inputs can be tapped at the output as shunt current. A gate according to the invention is as compared with known gates connected dually, that is, while the full voltage appears in known gates at the gate output, as a consequence of the peculiar cooperation of structural elements thereof, the switching elements according to the invention are connected so that the full current can be obtained from the output while the voltage can be correspondingly lower.

The various objects and features of the invention will appear from the description rendered below with reference to the accompanying drawing.

In the drawing:

FIGS. 2 and 3 the simplest cases of mixing gates; and FIG. 4 the simplest case of a blocking gate;

Figure 5:
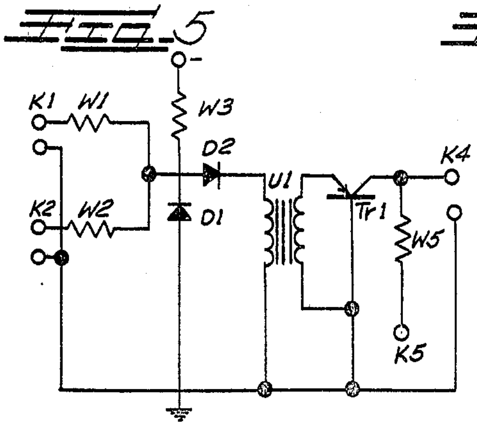
FIG. 5 illustrates a gate circuit according to the invention.
Figure 6:
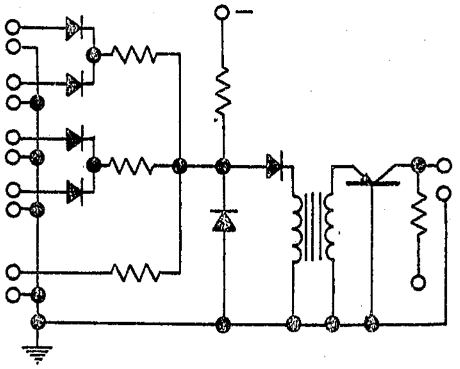

FIG. 6 indicates further gates that may be connected with the circuit according to FIG. 5.

The invention contemplates the production of a gate circuit operatively connecting a plurality of input circuits to a common output circuit, in which two inputs, adapted to receive like current impulses, are connected by suitable series elements to the output with a current impulse at the output being conducted to a low-ohmic load. A current-branching circuit, comprising passive elements, is disposed between the input and the output and an auxiliary voltage source whereby the current branching circuit is operative to produce at the output terminal, responsive to linking of input impulses, an output current impulse formed directly by the current of the input impulses and corresponding in magnitude to the value of one of the input impulses. The current branching circuit thus is operative to normally maintain the inputs free of potential, and to cause the output to be free of potential both normally and upon the triggering of only one impulse.

Referring now to FIGS. 1 to 4, each gate has two input terminals K1 and K2. The output is indicated at K3. To the ouput is in each case connected an amplifier having according to the invention a low input impedance so that practically the maximum output current (short-circuiting current) can be obtained from the corresponding gate. The output of the amplifier at which is obtained the amplified output signal of the gate is in each case indicated at K4.

Figure 1:
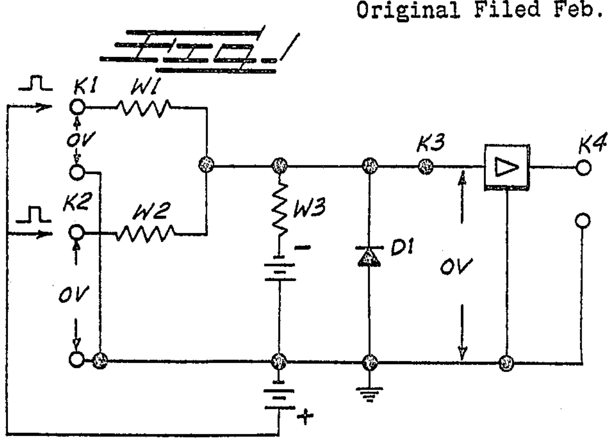
FIGS. 1 to 4 show the principles to be applied in making the three basic types of gates according to the invention, showing for each case the simplest realization, namely, FIG. 1 the simplest case of a coincidence gate.

In a coincidence gate according to FIG. 1, there is provided in addition to the two uncoupling input resistors W1 and W2, a resistor W3 and a diode D1. One side of the resistor W3 is connected to the common connecting point K3 disposed between the resistors W1, W2 and the diode D1, and the other side is connected to an auxiliary current source with negative potential; it being assumed that the other terminal of the diode is on ground or zero potential. So long as the inputs K1 and K2 are not triggered, a transverse current will flow over the resistor W3 and the diode D1 and the connecting point K3 between the diode D1 and the resistors W1, W2, W3, neglecting the internal resistance of the diode, will also be on ground potential. If one of the inputs, for example K1, is partially triggered, current will flow over the resistors W1 and W3, while nothing is changed with respect to the potential on K3, assuming appropriate dimensioning of the resistors, that is, K3 remains substantially at ground potential. No operative current flows in such a case over the diode D1 since both terminals are substantially at ground potential. However, if both inputs K1 and K2 are positively triggered, the potential at the connecting point or terminal K3 will become positive and current can flow over the load W3 disposed between K3 and the negative potential source. In the illustrated polarization of the diode D1, no current will in this triggered condition flow from the terminal K3 over the diode D1 to ground. Accordingly, ground potential will be at K3 in the normal condition as well as responsive to positive triggering of only a single input. The illustrated circuit therefore satisfies the requirements placed on a coincidence gate, since operative current can be taken off at the terminal K3 only and solely when both inputs K1 and K2 are triggered.

Figure 2:
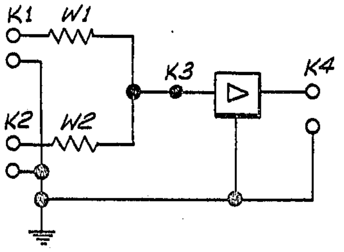

The manner in which the circuit according to FIG. 2 fulfills the requirements of a mixing gate will be readily apparent upon considering that it is immaterial to which of the terminals K1 or K2 a current is conducted; such current will appear on the terminal K3 and the full strength of said current will control the serially connected amplifier.

Figure 3:
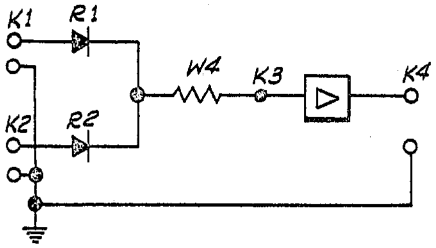

A circuit according to FIG. 3 may be provided if it is to be prevented that a current of double magnitude should appear in the mixing circuit at the terminal K3 when both inlets K1 and K2 are triggered simultaneously. There are provided two rectifiers R1 and R2, so that the triggering current flows to the terminal K3 over these rectifiers and a resistor W4.

Figure 4:
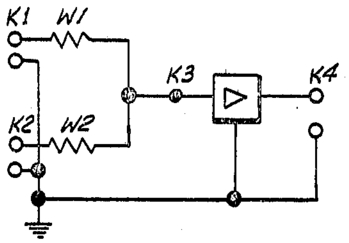

As shown in FIG. 4, a blocking gate constructed according to the invention does not differ basically from a mixing gate. The result to be achieved is obtained in the illustrated blocking gate merely by conducting to one of the terminals, for example, to the terminal K2, a pulse of a polarity which is opposed to that of the pulse conducted to the terminal K1. No current will accordingly appear on terminal K3 if both input terminals are triggered in this manner.

It may possibly be assumed that, in connection with customary gates at the output of which appear certain voltages but relatively low currents, the use of a transformer would provide the same effect as in gates according to the invention. However, it would be necessary to use a transformer with a relatively high ratio of transformation and above all one with high transverse inductance. Such transformers, if they are to provide for satisfactory impulse operation, are however relatively expensive and require on account of the number of turns needed for high transverse inductance, considerable space, which would be troublesome in gate circuits which are needed in great number in some machines. In cases where such an expenditure for a transformer is tolerable, it is in accordance with a further feature of the invention entirely possible to connect in series with a gate made in accordance with the invention, a simple voltage amplifier with a low input impedance.

However, in a gate circuit according to the invention, a voltage amplifier with a low input impedance can be practically connected directly following the gate. The arrangement between the output of the gate and the input of a serially connected amplifier, of a simple transformer, for current increase, is considered of advantage merely in a case where a certain small current loss is to be equalized or in the event that several additional gates following the output are to be connected as is often the case in caculating machines, for example, for adding operations. Such a transformer can, however, be structurally very simple because its ratio of transformation may be low and it need not have any particular transverse inductance since the transistor has a low input impedance, the gate being constructed so that it may be connected directly with a load having a low input impedance.

A circuit example for such a case is shown in FIG. 5. This example of an embodiment of the invention comprises a coincidence gate according to FIG. 1 connected together with a transistor amplifier. In addition to the resistors W1, W2 and W3, and diode D1 there is a further diode D2, a transformer U1, a transistor *Tr*1 and a resistor W5, the last-named resistor being disposed in the collector circuit of the transistor. The transformer has a ratio of transformation greater than $n/1$. It is assumed that further gates are to be operated in parallel following the output K4; accordingly as compared with the currents on the input terminals K1 and K2, there must be an n-fold current available at the output terminal K4. The ratio of transformation is to be greater than $n/1$ because of the electrical tolerances of the structural parts occasion some current loss and because a transistor in a basic circuit has an amplification rate lower than 1. The transistor is being operated in basic current because it exhibits in such circuit the best pulsing properties. It serves solely for voltage amplification and receives collector voltage from terminal K5 over resistor W5. The diode D2 prevents current flow over the primary winding of the transformer U1 in normal condition of the circuit. The diode D2 would be dispensable if the diode D1 would have in pass direction effective O resistance.

The thought could possibly occur to dispose the transformer U1 in the collector circuit of the transistor *Tr*1, for example, in parallel or in place of the resistor W5; it must be considered, however, that the collector circuit has a high internal impedance and that the transformer accordingly would have to have a high transverse inductance. Aside from the fact that such a transformer would be very much larger, it would exhibit unfavorable frequency properties, that is, it would due to high inductance and resulting capacitance and resonance capacitances tend to over-oscillate.

The illustrated and described embodiments of gates are by no means exhaustive. The various types of gates may be used in desired combinations. Such gate combinations may be operated with a serially connected amplifier as shown in FIG. 6 to give an example.

FIG. 6 shows the combination of two mixing gates according to FIG. 3 with a coincidence gate according to FIG. 1, and comprising a blocking input E. Only one transistor is provided for amplification.

Moreover, there may in some cases be provided several voltage amplifiers, that is, transistors, connected serially or in parallel, and in the latter case, with a transformer having a plurality of secondary windings.

The foregoing explanations are concerned with the use of particular transistors; it is understood, of course, that other types of semiconductor elements (point contact transistors; double-base diodes, etc.) may also be used for the desired amplification.

Changes may be made within the scope and spirit of the appended claims.

What we claim as new and desire to secure by Letters Patent is:

1. A coincidence gate circuit comprising:
(a) a pair of input terminals to which current impulses of similar amplitudes may be applied,
(b) a pair of input resistors with first ends connected together to form a junction and their second ends connected respectively to said pair of input terminals,
(c) an auxiliary voltage source,
(d) a third resistor with one end connected to said auxiliary voltage source and its second end connected to the junction between said pair of input resistors,
(e) a first diode connected between ground and the second end of said third resistor and poled so that current will flow through said diode and said third resistor unless input signals are present at both of said pair of input terminals,
(f) a transformer with one end of its primary connected to ground, (g) a second diode connected between the second end of said third resistor and the second end of said primary and poled to pass positive pulses,
(h) a common base transistor stage with its input connected to the secondary of said transformer,
(i) an output terminal connected to the output of said common base transistor stage, and the relationship of the impedance of said pair of resistors and the third resistor being so dimensioned and said diode so poled that a current having a magnitude of a single input to one input terminal is insufficient to block said first diode but, said first diode blocked by two inputs at both of said input terminals to produce a current impulse at said output terminal.

References Cited

UNITED STATES PATENTS

| | | | |
|---|---|---|---|
| 2,853,632 | 9/1958 | Gray | 307—203 X |
| 2,959,687 | 11/1960 | Eckert | 307—218 X |
| 2,603,746 | 7/1952 | Burkhart et al. | 307—215 X |
| 2,628,346 | 2/1953 | Burkhart | 307—215 X |

DONALD D. FORRER, Primary Examiner

U.S. Cl. X.R.

307—203; 328—94